Feb. 23, 1932.  L. A. PARADISE ET AL  1,846,691
COMBINED HARVESTER AND THRESHER
Filed March 28, 1927   6 Sheets-Sheet 1

Inventors
Louis A. Paradise,
Edwin Frederick Huddle,
John L. Jackson.
Attorney

Feb. 23, 1932.   L. A. PARADISE ET AL   1,846,691
COMBINED HARVESTER AND THRESHER
Filed March 28, 1927    6 Sheets-Sheet 2

Feb. 23, 1932.  L. A. PARADISE ET AL  1,846,691
COMBINED HARVESTER AND THRESHER
Filed March 28, 1927   6 Sheets-Sheet 5
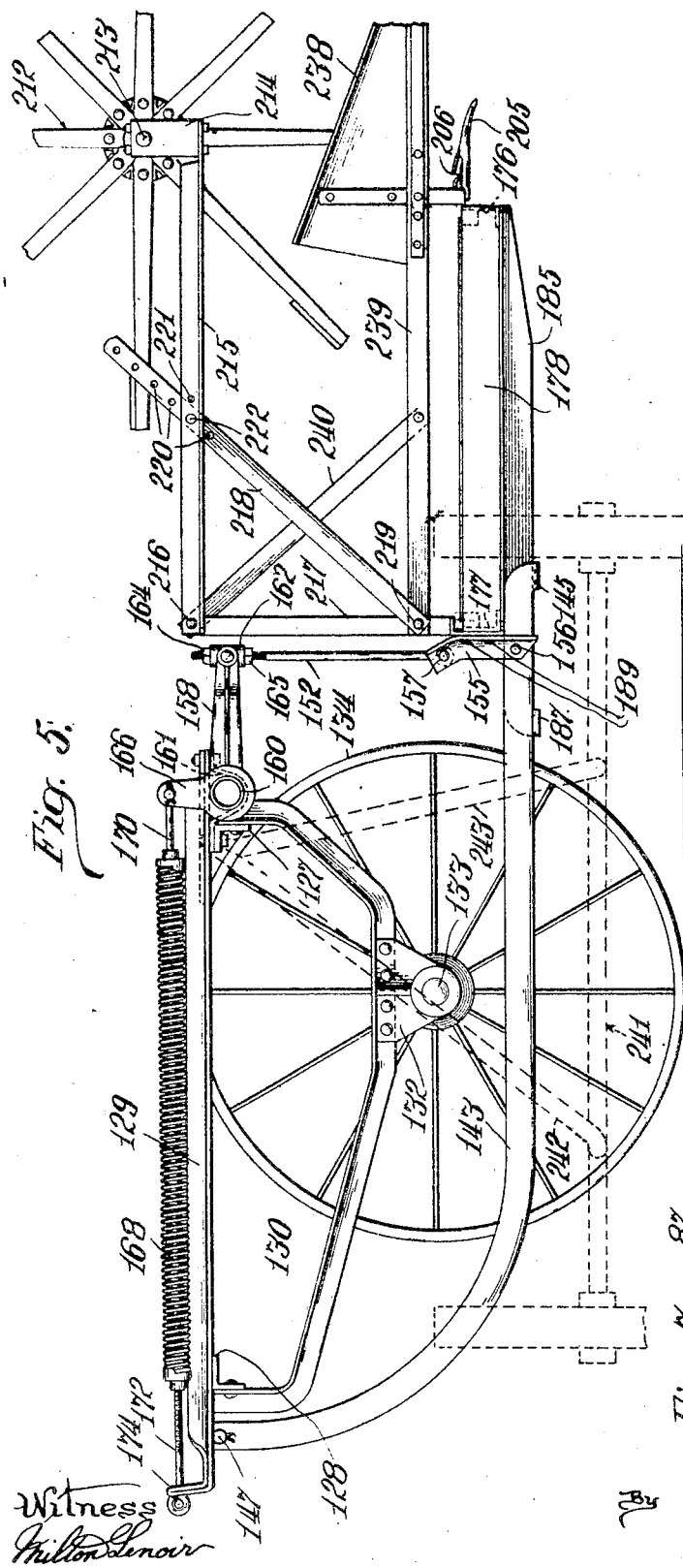
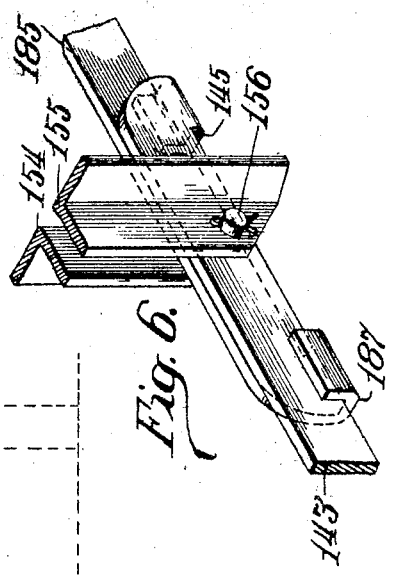
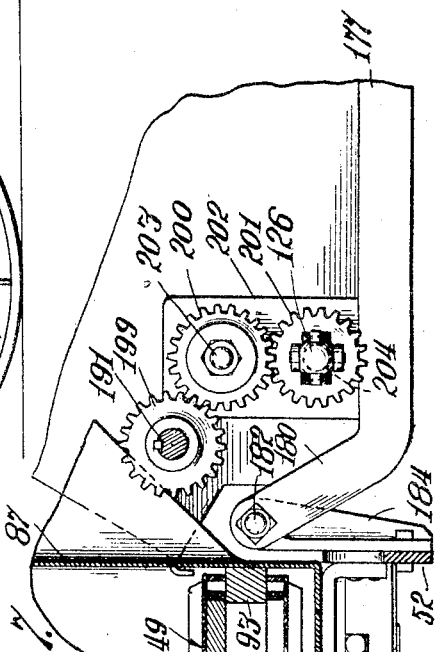

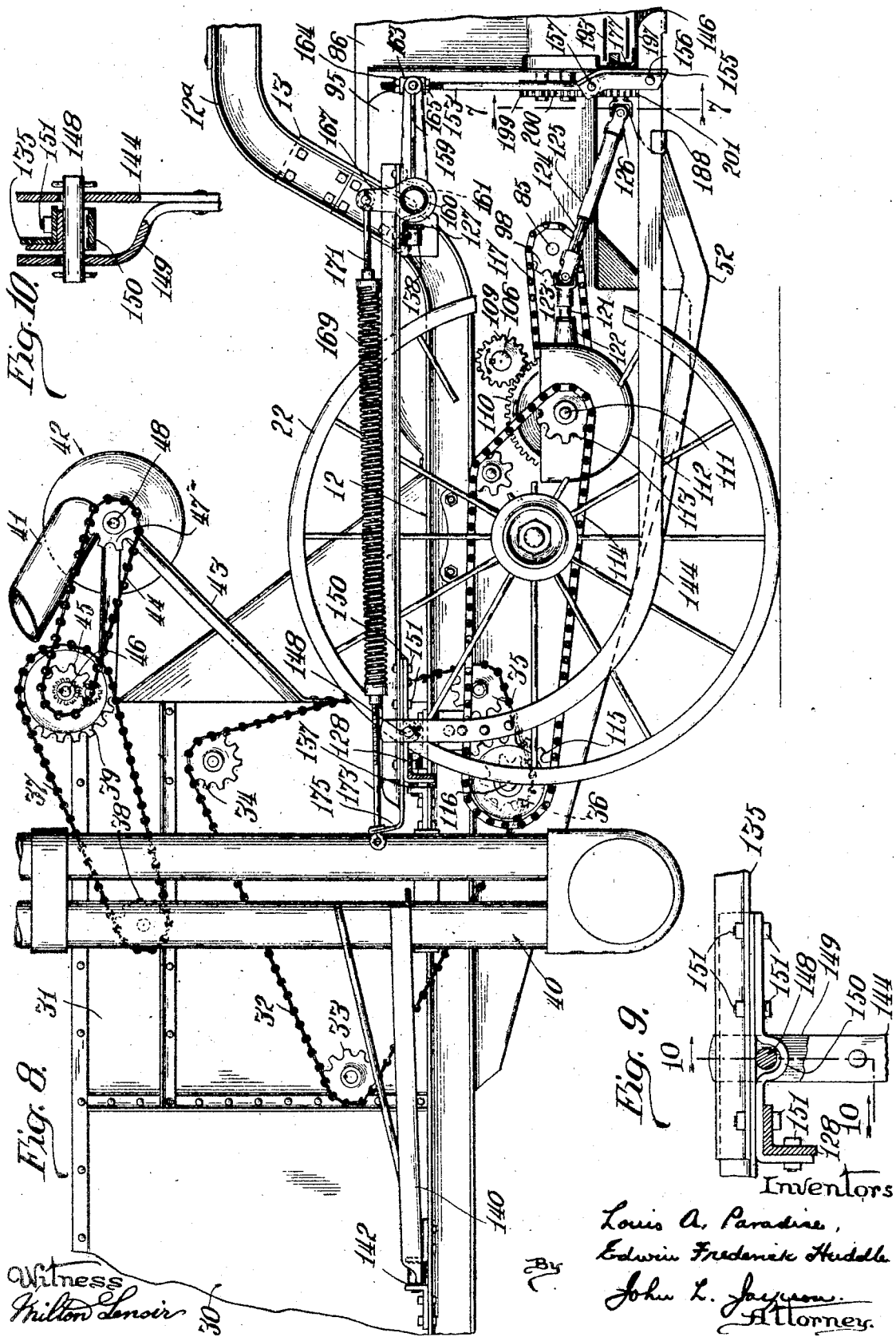

Patented Feb. 23, 1932

1,846,691

UNITED STATES PATENT OFFICE

LOUIS A. PARADISE AND EDWIN FREDERICK HUDDLE, OF MOLINE, ILLINOIS, ASSIGNORS TO DEERE & COMPANY, OF MOLINE, ILLINOIS, A CORPORATION OF ILLINOIS

COMBINED HARVESTER AND THRESHER

Application filed March 28, 1927. Serial No. 178,941.

Our invention relates to machines designed for cutting standing grain and threshing it, as a continuous operation, and it has for its object to provide several improvements in such machines by which they may be used to better advantage in the field in the work of recovering the crop and also may be more conveniently transported from one scene of operations to another. Such machines are necessarily of large dimensions, particularly as to width, which interferes with their transportation along roads and through gates, and certain of the improvements embodied in the machine which forms the subject of this application have to do with special features of construction by which this difficulty is in a large measure overcome. Other of such improvements relate to the better adaptation of the machine for operating over uneven ground, to improved means for driving the operating parts, and to improved means for vertically adjusting the harvesting mechanism. In addition to these more important features of improvement our invention also includes others that will be pointed out in connection with the description of the particular embodiment of our invention illustrated in the drawings. What we regard as new is set forth in the claims.

In the accompanying drawings which illustrate a preferred embodiment of our improvements,—

Fig. 5 is a side elevation of the harvester portion of the machine viewed from the grainward side;

Fig. 6 is a detail, being a perspective view of one of the folding joints in the connections between the harvesting mechanism and a wheeled support associated therewith;

Fig. 7 is a partial vertical section on line 7—7 of Fig. 8;

Fig. 8 is a partial longitudinal vertical section on line 8—8 of Fig. 1, looking stubbleward;

Fig. 9 is a detail, being a longitudinal vertical section on line 9—9 of Fig. 1; and Fig. 10 is a vertical cross-section on line 10—10 of Fig. 9.

Figure 1:
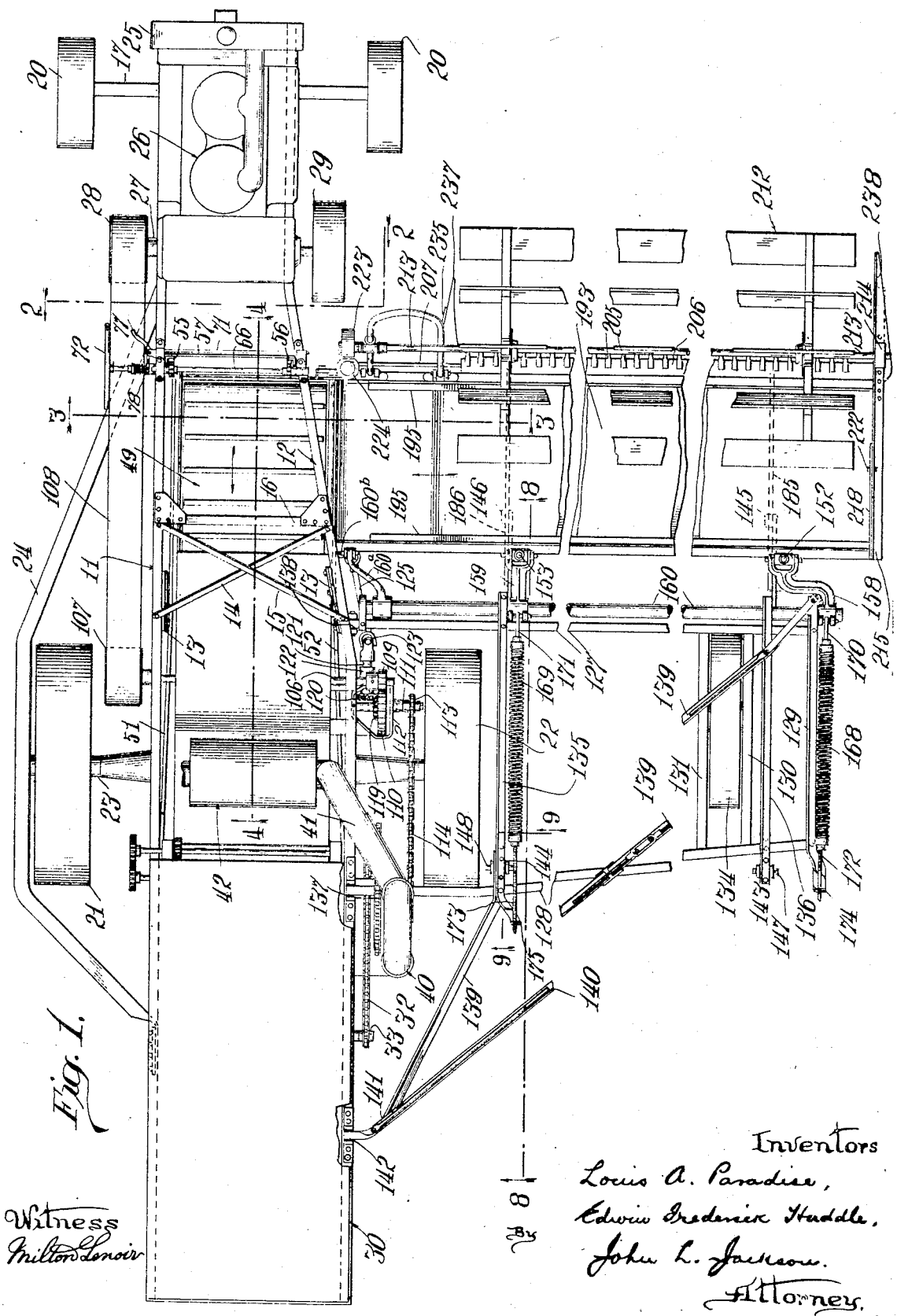
Fig. 1 is a plan view of a combined harvesting and threshing machine, certain parts being broken away.

Before proceeding to a detailed description of the machine illustrated in the drawings it will be well to explain briefly its general construction. It comprises a main frame supported at the front on a swiveled transverse axle on which are mounted the front wheels, the rear portion of the frame being supported on rear wheels mounted on a fixed transverse axle. The machine shown is not designed for self-propulsion, but is intended to be drawn by a tractor, although it should be understood that our improvements may be applied to a self-propelled machine, in which case the front wheels would be of the dirigible type commonly used on self-propelled vehicles, and the rear wheels would be driven by power. The various operating parts of the machine are driven by power, preferably supplied by an internal combustion motor mounted on the front portion of the main frame, but if desired the driving power could be taken from a tractor through a power take off. The means by which power is transmitted to the operating parts will be described in detail later on; for the present it will suffice to say that such transmission devices are so designed as not to interfere with the various relative movements of the parts to which attention will be presently directed.

The rear portion of the main frame supports the threshing mechanism, which may be of any approved type and, separately considered, forms no part of our present invention. Between the threshing mechanism and the power plant or motor is a conveyor which conducts the cut grain to a cylindrical beater that is the initial element of the threshing mechanism, such conveyor being supported from the main frame upon an auxiliary frame, which, for convenience, will be termed the conveyor frame, and is vertically adjustable independently of the main frame. This conveyor frame is connected at the front with the main frame by uprights that are vertically adjustable, and at the rear it is pivotally connected with the main frame, preferably at a point back of the axle of the rear wheels, the arrangement being such that the front end of the conveyor frame may be swung up and down and be secured in its different positions of adjustment. The parts thus far described constitute one of the units of the combined machine, which may conveniently be termed the threshing unit. Associated therewith is another unit that will be referred to as the harvesting unit, the latter comprising a transversely extending frame hinged to the main frame to swing vertically about an axis extending longitudinally of the machine, and supported at its outer or grainward end by a ground wheel. This frame, which will be termed the harvester supporting frame, is provided with forwardly projecting means for supporting the operating parts of the harvester, including a reciprocating sickle bar which cuts the grain, an endless apron that receives the cut grain and carries it to and deposits it upon the conveyor of the thresher unit, and the usual rotating reel that feeds the grain to the sickle bar. The operating parts of the harvester are supported by a transverse frame, which will be termed a harvester frame; the latter being movably suspended from the harvester supporting frame and operably connected with the conveyor frame so that as the latter is moved up and down, the harvester frame will be adjusted to regulate the height of cut. The inner end of the harvester frame is also pivotally connected with the conveyor frame so that the outer end of the harvester frame can swing up and down relative to the conveyor frame as the harvester supporting frame travels over uneven ground. The connections are such that after the harvester frame has been disconnected from the conveyor frame, it, with the parts carried by it, can be swung up about a transverse axis to fold over upon the harvester supporting frame. Where the machine is to be transported any considerable distance the harvester supporting frame and the harvester frame may be disconnected from the thresher unit and the harvester frame and its mechanism swung up over the harvester supporting frame, when by placing a suitable truck or dolly under the latter frame it may be hitched behind the main frame in tandem formation and thus be hauled by it to a new scene of operations.

The sickle bar, the reel and the harvester apron are all driven from the motor on the main frame through suitable transmission connections so arranged as not to interfere with the flexibility of the machine, and of such design that they may readily be disconnected when the harvester unit is to be detached.

Referring now to the drawings it will be seen that the main frame comprises two side members 11, 12 spaced a suitable distance apart and extending from end to end of the machine. Said side members, which are best made of channel bars, are set somewhat closer together at the front than at the rear, and their intermediate portions are arched, as shown at 11ª, 12ª in Fig. 2 to clear certain of the parts. Also, said bars are preferably made in sections joined together, as by plates 13 shown in Fig. 4, and they are suitably braced to form a rigid structure, as by braces 14, 15, 16 shown in Fig. 1. They are also connected together at their ends in any suitable way. At the front the main frame is supported upon a transverse front axle 17 by means of a bracket 18 connected with the main frame by a swivel 19. The axle 17 carries ground wheels 20, as shown in Fig. 1. It will be understood that instead of mounting the front portion of the frame on dirigible wheels in the manner described any other suitable arrangement for the purpose may be employed.

The rear portion of the main frame is supported on rear wheels 21, 22 mounted on a transverse rear axle 23 connected with the main frame in any suitable way. The stubbleward end of the rear axle 23 is braced by a brace 24, the end portions of which are connected with the side member 11 of the main frame. This brace serves also as a guard for the wheel 21.

At the front of the main frame is a radiator 25, back of which is an internal combustion motor 26 suitably mounted on the main frame and operatively connected in any approved way with a transverse shaft 27 journaled in suitable bearings on the main frame. Said shaft carries at one end a pulley 28 and at the other end a flywheel 29. These parts constitute the power plant from which power is derived to drive the operating parts of the thresher as well as of the harvester.

Mounted on the rear portion of the machine is a thresher 30 which may be of any preferred type. In the illustrated construction the operating parts are principally enclosed in a housing 31 and are driven through a link belt 32 running over sprocket wheels 33, 34, 35 and 36, and a link belt 37 running over sprocket wheels 38, 39. The parts driven by these belts are not shown as they have nothing to do with our present invention. The thresher also comprises an elevator 40 which discharges through a pipe 41 to a recleaner 42 supported on brackets 43. The recleaner is driven by a link belt 44 which runs over a sprocket wheel 45 carried by a shaft 46 that also carries the sprocket wheel 39, and said belt drives a sprocket wheel 47 mounted on the recleaner shaft 48. These arrangements are all shown in Fig. 8. The belts 32 and 37 are inter-connected within the housing 31, but it is deemed unnecessary to show and describe such connections. It is important to note only that the belt 32 through which the several parts of the threshing mechanism are driven is itself driven from the motor 26 through connections which will be pointed out more in detail later.

Figure 2:
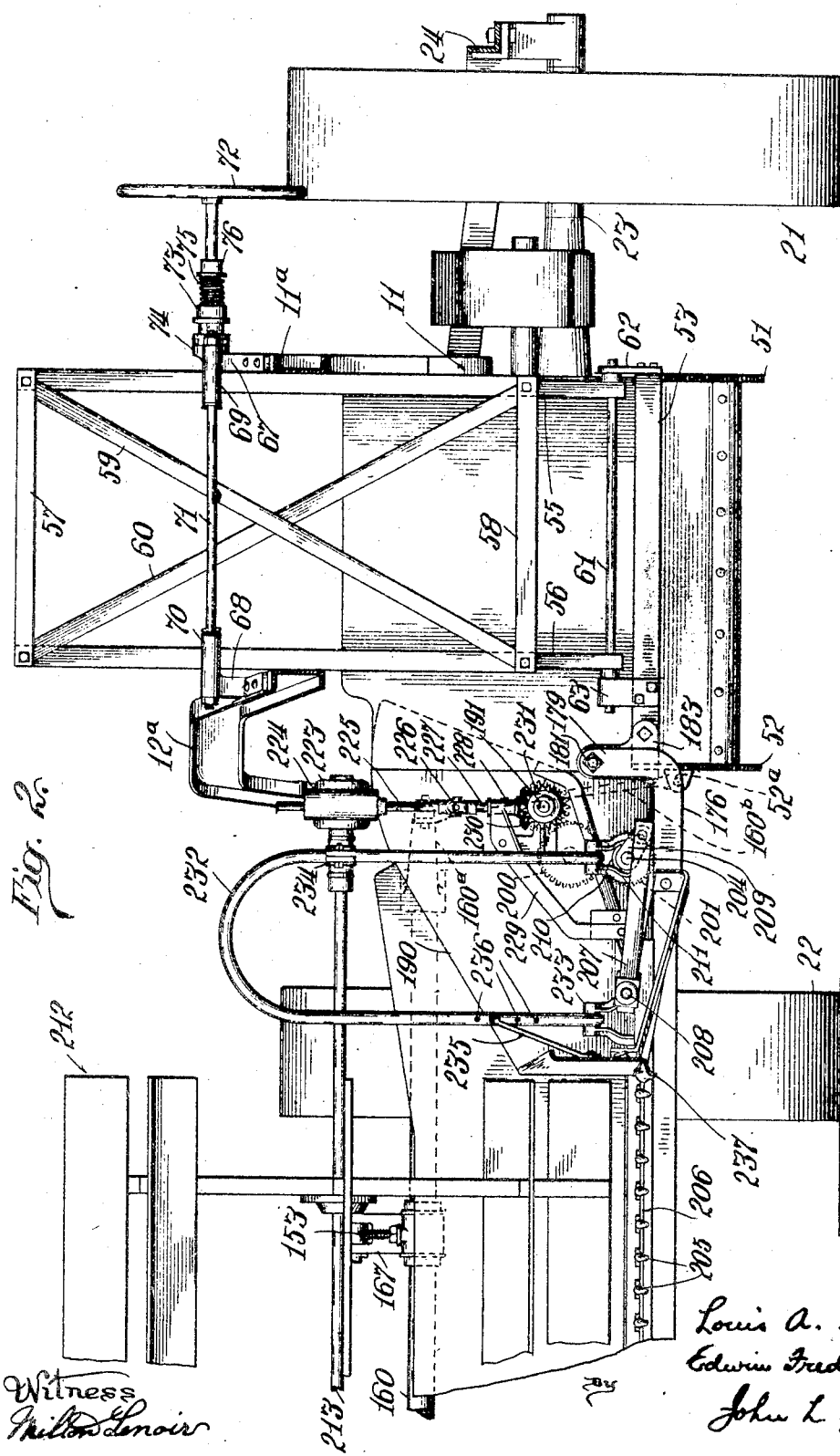
Fig. 2 is a partial vertical cross-section on line 2—2 of Fig. 1 looking toward the rear, as indicated by the arrows.
Figure 3:
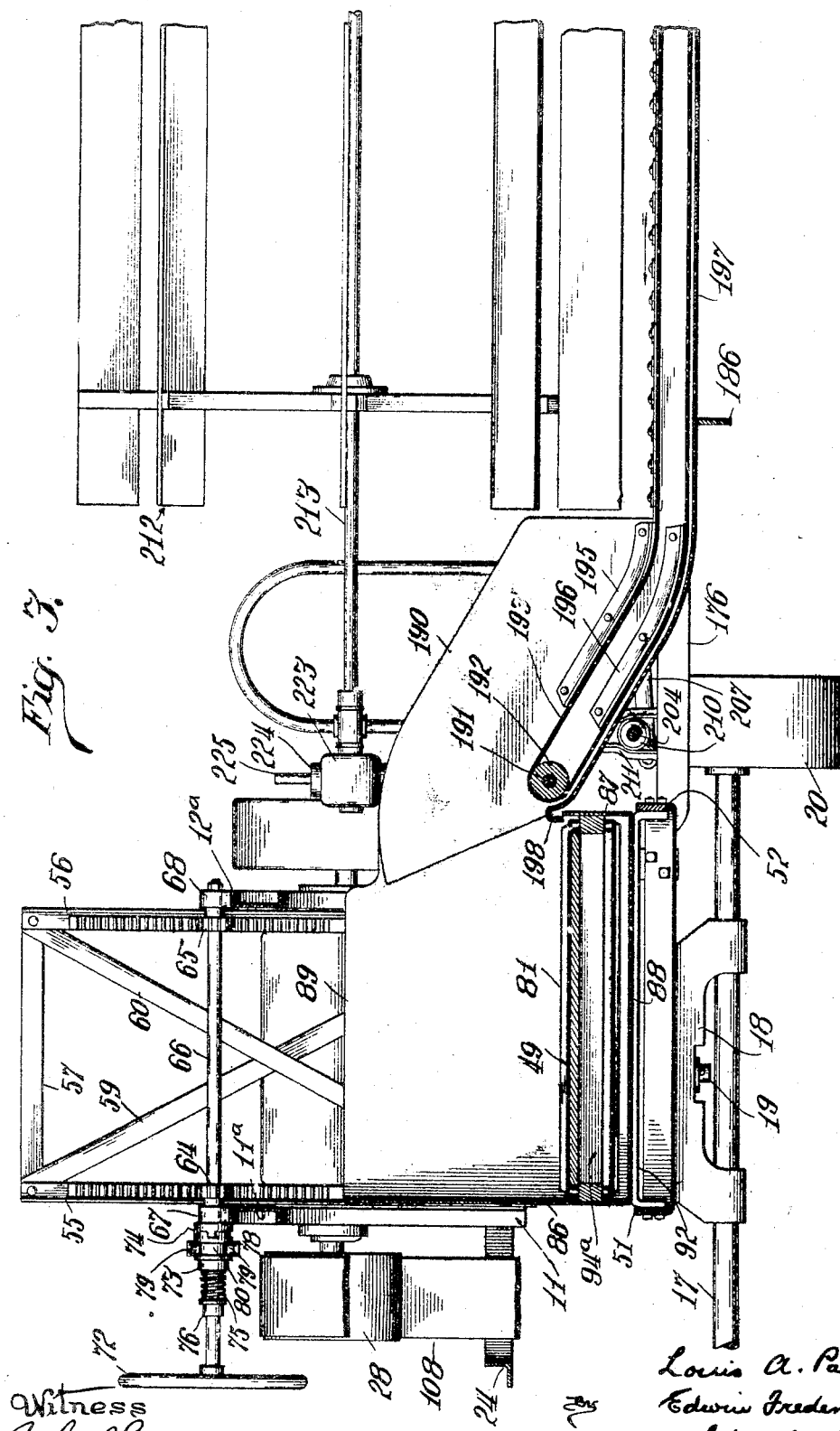
Fig. 3 is a partial vertical cross-section on line 3—3 of Fig. 1, looking toward the front, as indicated by the arrows.
Figure 4:
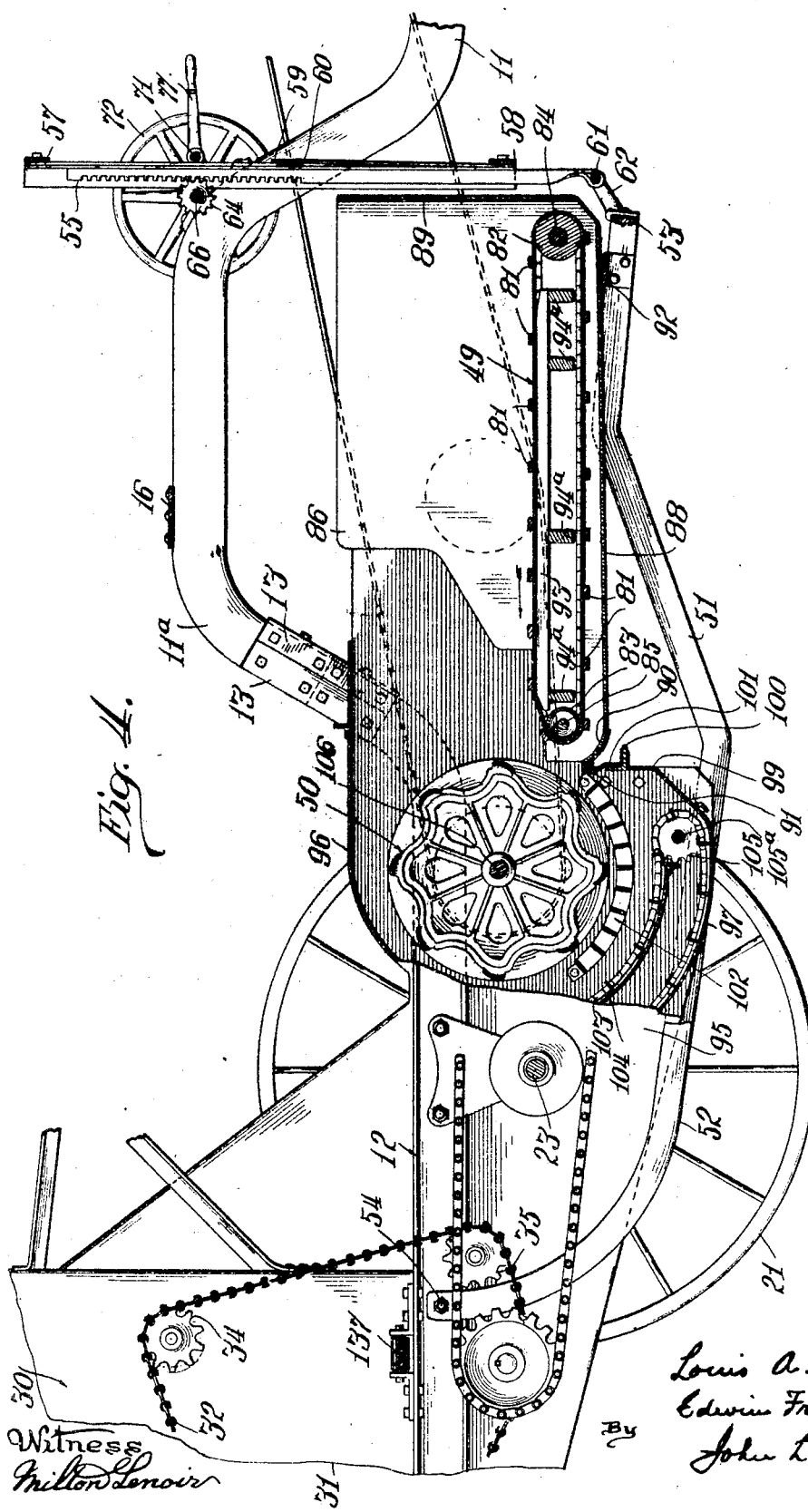
Fig. 4 is a partial longitudinal vertical section on line 4—4 of Fig. 1 looking toward the stubble side of the machine.

Located between the main thresher housing and the power plant are a conveyor 49 and a beater 50 best shown in Fig. 4. The conveyor is supported by a conveyor frame comprising longitudinally extending bars 51, 52 arranged at opposite sides of the main frame and connected together at the front by a cross-bar 53. The rear ends of the bars 51, 52 are pivotally connected to the side bars 11, 12 of the main frame by pivots 54 so that the front ends of said bars may swing vertically. The front end of the conveyor frame is adjustably supported from the main frame by means of vertical rack bars 55, 56 connected together by cross-bars 57, 58 and by diagonal bars 59, 60, to form a rectangular frame, as best shown in Figs. 2 and 3. The lower ends of the rack bars are connected to the conveyor frame by means of a transverse rod 61 journaled in brackets 62, 63 secured to the opposite end portions of the cross-bar 53, as best shown in Figs. 2 and 4. The rack-bars 55, 56 mesh with pinions 64, 65 carried by a shaft 66 journaled in suitable bearings 67, 68 carried by the side bars 11, 12 so that by rotating said shaft said rack bars may be moved vertically in unison in either direction. Sleeves 69, 70 secured to the side-bars 11, 12, and connected by a cross-rod 71, bear against the front surfaces of said rack-bars and hold them in mesh with the pinions 64, 65, as best shown in Fig. 4.

The shaft 66 is rotated to move the rack bars 55, 56 vertically by means of a hand wheel 72 mounted on the outer end of said shaft. Said shaft is normally locked against rotation by means of a clutch member 73 having a feathered connection with said shaft so that it may move longitudinally thereof but it is non-rotatable thereupon. Said clutch member is provided with a toothed inner face adapted to interlock with a fixed clutch member 74 formed integral with the bearing 67, which is also integral with the sleeve 69. As the clutch member 74 does not rotate it will be apparent that when the clutch member 73 is in engagement with it the shaft 66 will be held against rotation. The clutch members 73, 74 are normally held in engagement with each other by a spring 75 on the shaft 66, one end of which spring bears against the clutch member 73, its other end bearing against a collar 76 on said shaft, as shown in Fig. 3. The clutch member 73 may be moved out of engagement with the clutch member 74, to permit rotation of the shaft 66, by means of a lever 77 fulcrumed on the side bar 11 and having a yoke 78 at one end provided with pins 79 that project into a peripheral groove 80 in the clutch member 73, as best shown in Fig. 3. By this construction the shaft 66 is normally locked against rotation, and, therefore, the rack bars 55, 56 are held against vertical movement, thereby holding the front end of the conveyor frame in fixed position. When it is desired to adjust the conveyor frame vertically the lever 77 is operated to release the shaft 66, whereupon by means of the hand wheel 72 said shaft may be rotated in the desired direction.

The conveyor 49 is in the form of an endless belt provided with cross-slats 81, and it is mounted on roller 82, 83 carried respectively by transverse shafts 84, 85, the ends of which are journaled in vertical plates 86, 87 at opposite sides of the conveyor, as best shown in Fig. 3. These plates are joined underneath by a bottom plate 88 preferably integral therewith, and they are also joined at their front ends by a front plate 89. The plates 86 and 89 are extended upward a considerable distance above the conveyor 49, as best shown in Figs. 3 and 4, and serve as walls or shields at the front and stubbleward sides of the conveyor to direct the grain coming from the harvesting mechanism upon it. The plate 87 at the grainward side of the conveyor terminates at about the upper level of the conveyor so that that side is left open for the admission of grain. As shown at 90 in Fig. 4, the rear end of the bottom plate 88 is curved upwardly slightly and is provided with a downwardly extending lip 91 the purpose of which will be explained later. These several plates may be considered as constituting a housing for the conveyor 49, which is open at the rear and at the grainward side of the conveyor, and serves to support it. The front portion of the housing and the front end of the conveyor 49 are supported on the side bars 51, 52 of the conveyor frame by means of a transverse bar 92 on which the bottom plate 88 rests loosely, as shown in Figs. 3 and 4, said bar having its ends turned down and secured to the side bars 51, 52, as shown in Fig. 3. The manner in which the rear portion of the housing is supported will be hereinafter explained.

The upper flight of the conveyor 49 runs over a series of longitudinal slats 93 carried by cross-bars 94ᵃ secured to the side plates 86, 87, as shown in Figs. 3 and 4, so that the conveyor is prevented from sagging under the weight of the grain carried by it.

Back of the conveyor housing is a housing for the beater 50, which housing comprises side plates 94, 95, a top plate 96, and a bottom plate 97, shown in Fig. 4. These plates all merge at the rear with the housing of the threshing mechanism, and it should be understood that they are here particularly referred to and designated by reference numerals merely for convenience of description and not because the specific arrangement of these parts has anything to do with our invention. Any suitable form of housing for the beater may be used provided that it be so arranged that it may be associated with the conveyor housing in such manner as not to interfere with the vertical adjustment of the latter. The beater housing is fixedly secured to the side bars 11, 12 of the main frame, but is not connected with the side bars 51, 52 of the conveyor frame, as the latter frame must be free to move vertically independently of the beater housing. The rear end portion of the conveyor housing, and the shaft 85 that carries the rear end of the conveyor 49, are supported by the side walls 94, 95 of the beater housing by journaling the shaft 85 in said side walls as shown in Fig. 8, and as also shown in said figure, said shaft is extended through the side wall 95 and is provided outside of said wall with a sprocket wheel 98 by means of which said shaft and the conveyor 49 are driven, as will be hereinafter described. By this construction when the front end of the conveyor frame is raised or lowered to adjust the height of the harvester mechanism, as will be hereinafter described, the conveyor may swing about the shaft 85 as an axis and maintain its proper relation to the grain conveying means of the harvester mechanism. When this adjustment is made the cross-bar 92 moves fore and aft to a limited extent under the bottom 88 of the conveyor housing. It will be noted that by the construction described vertical adjustment of the harvester mechanism and the front end of the conveyor 49 does not affect the tension of the conveyor belt.

As shown at 99 in Fig. 4, the front end of the bottom plate 97 of the beater housing is extended upwardly and secured to a transverse angle iron 100 that forms a cross-brace therefor, the ends of said angle iron being secured to the side plates 94, 95 of said housing. A transverse plate 101 is secured to and rises from said angle iron and underlies the lip 91 at the rear end of the bottom plate 88 of the conveyor housing, thereby forming an overlapping flexible joint between these two bottom plates, so that the necessary swinging movement of the conveyor housing is not interfered with.

Extending under the beater 50 is the usual concave 102, and underlying said concave is an endless conveyor 103, the upper flight of which travels over a concave plate 104, as shown in Fig. 4. The lower end of the conveyor 103 travels over sprocket wheels 105 carried by a shaft 105ª mounted in the side plates 94, 95. The beater 50, the concave 102, the conveyor 103 and the driving mechanism for said conveyor may all be of any approved design, and our present invention is not concerned with those parts or any of the parts of the threshing mechanism proper. For the purposes of this application it is important only that the beater 50 be associated with the conveyor 49 in such manner as to permit said conveyor to be adjusted vertically independently of the main frame of the machine and the parts mounted on it.

The beater 50 is mounted on a shaft 106 that is journaled in the side plates 94, 95 of the beater housing, and, therefore, is supported by the main frame. Said shaft extends through both said side walls, as shown in Fig. 1, and on its stubbleward end carries a pulley 107 driven by a belt 108 from the pulley 28 on the main drive shaft 27. At its grainward end the shaft 106 carries a power take-off pinion 109 through which power for driving the various parts of the threshing mechanism and also the harvesting mechanism is derived. As best shown in Figs. 1 and 8, the pinion 109 meshes with a gear 110 that is carried by a shaft 111 mounted in a suitable bracket 112 secured to the side plate 95 of the beater housing. Mounted on the outer end of the shaft 111 is a sprocket wheel 113 which is connected by a link belt 114 with a sprocket wheel 115 shown in Fig. 8. The latter sprocket wheel is mounted on a shaft 116 that carries the sprocket wheel 36, so that by these connections the several operating parts of the threshing or separating mechanism are driven from the beater shaft 106.

The conveyor 49 is also driven from the shaft 106 by means of a link belt 117, shown in Fig. 8, which travels over the sprocket wheel 98 on the conveyor shaft 85, and over a sprocket wheel 118 on the inner end portion of the shaft 111, which, as has been explained, is driven through gears 109, 110 from the shaft 106, but in a reverse direction. The beater shaft 106 rotates in a clockwise direction as viewed in Figs. 4 and 8, and consequently the conveyor shaft 85 rotates in the opposite direction, so that the upper flight of the conveyor belt travels toward the beater 50 and delivers the grain deposited on it to the beater at a point over the right hand end of the concave as it appears in Fig. 4. Vertical adjustment of the front end of the conveyor 49 does not interfere with this operation since when such adjustment is made the rear end of the conveyor merely turns slightly about the shaft 85 as a fixed axis.

In addition to serving as a power transmitter for driving the threshing mechanism, the shaft 111 also transmits power from the shaft 106 to drive the harvesting mechanism, to which end said shaft is provided with a bevel gear 119 which meshes with a bevel gear 120 mounted on a shaft 121 that extends fore and aft at the grainward side of the machine and is journaled in a bearing 122 carried by the bracket 112, as best shown in Figs. 1 and 8. At its forward end the shaft 121 carries a universal joint connection 123 by which it is connected with the rear member 124 of a telescopic shaft, the front member of which is best shown at 125 in Fig. 8. The member 124 is adapted to slide longitudinally in the member 125, but is keyed thereto so that the two members rotate in unison. At its forward end the member 125 is provided with a universal joint connection 126 through which power is transmitted to the harvesting mechanism, as will be hereinafter described.

As has been mentioned, the harvester unit comprises a harvester supporting frame which is hinged to the main frame to swing vertically, and is supported at its outer or grainward end by a ground wheel. This harvester supporting frame is composed of a number of elements, the principal ones being front and rear transverse bars 127, 128 spaced apart and pivotally connected at their inner ends with the side bar 12 of the main frame at opposite sides of the rear axle 23, as best shown in Fig. 1. The bars 127, 128 are preferably made of angle iron, and they are connected together at their outer ends by a bar 129, also of angle iron, that extends longitudinally of the machine, or, in other words, fore and aft. The bars 127, 128 are also connected together adjacent to the bar 129, by two spaced approximately U-shaped brackets 130, 131 shown in Figs. 1 and 5, which extend downward from the frame bars 127, 128 and carry plates 132 in which is mounted a stub axle 133 that carries a ground wheel 134. The brackets 130, 131 are spaced far enough apart to receive the wheel 134 between them, as shown in Fig. 1. The inner and outer portions of the bars 127, 128 are connected together by longitudinally extending bars 135, 136, also preferably of angle iron, as shown in Fig. 1, so that the transverse bars 127, 128 and the longitudinal bars 129, 135, 136 together make up a rigid approximately rectangular frame that projects laterally from the main frame, and, as has been suggested is pivotally connected therewith. Such pivotal connection is of a character to permit the outer end of the harvester supporting frame to swing vertically with respect to the main frame, the pivotal connections thereof being shown at 137, 138 in Fig. 1. The harvester supporting frame is braced from the main frame to hold its outer end against rearward deflection, by braces 139, 140 that connect respectively with the rear end portion of the bar 135 and the front end portions of the bars 136 and 129, as also shown in Fig. 1. Said braces are brought together at their inner ends, as shown at 141 in Fig. 1, and are pivotally connected with the side bar 12 of the main frame, as shown at 142 in said figure, this connection being such as to permit the outer ends of the braces to swing vertically with the outer portion of the harvester supporting frame.

The harvester supporting frame is provided with two longitudinally extending vertically swinging beams 143, 144, which, as shown in Figs. 5 and 8, are in the form of bars curved upwardly at their rear ends, their forward portions being straight, and provided at their front ends with stirrups 145, 146. The upwardly curved rear end of the beam 143 is pivotally connected by a transverse pivot 147 with the rear portion of the bar 136, and in like manner the corresponding end of the beam 144 is pivotally connected with the bar 135 by a pivot 148. By this arrangement the forward ends of the beams 143, 144 may swung vertically about their respective pivots 147, 148. These pivotal connections are comparatively loose or sloppy to allow some play between the parts, as shown in Figs. 9 and 10, and preferably straps 149 are connected with the upper ends of said beams to receive the end portions of the pivots 147, 148. Said pivots are mounted on the bars 135, 136 by straps 150 secured to said bars and also to the transverse bar 128 by bolts 151, as shown in Fig. 9.

The front end portions of the beams 143, 144 are adjustably supported from the harvester supporting frame by means of rods 152, 153, the lower ends of which are pivotally connected with the front end portions of the beams 143, 144 in the manner shown in Figs. 5, 6 and 8. The connections of both said rods are alike, and, therefore, a description of one will suffice. Referring particularly to Figs. 5 and 6, it will be seen that the front end portion of the beam 143 carries two angle iron standards 154, 155 disposed oppositely to each other at opposite sides of the beam 143, and pivotally connected with said beam by a pivot 156. The upper ends of said standards are connected by a pivot 157 with the lower end of the rod 152, which fits between them so that the parts may turn with respect to each other about a transverse axis. The corresponding connections of the rod 153 are indicated by the same reference numerals. The upper ends of the rods 152, 153 are connected, respectively, to forwardly extending crank arms 158, 159 carried by a transverse rock shaft 160 pivotally mounted in the front portion of the harvester supporting frame, preferably in front of the transverse bar 127, as shown in Figs. 5 and 8. Straps 161 that extend under the rock shaft 160 and are connected with the forward ends of the bars 129, 135, serve as pivotal supports for said rock shaft. The connections between the upper ends of the rods 152, 153, and the crank arms 158, 159 are in the form of blocks 162, 163 having swiveled connection with the arms 158, 159, and adjustably connected with the rods 152, 153 by nuts 154, 165 screwed on the upper ends of said rods at opposite sides of said blocks.

The rock shaft 160, which is preferably tubular, is provided, adjacent to the arms 158, 159, with upwardly extending arms 166, 167, which preferably are formed integral with the arms 158, 159, respectively, forming bell-crank levers. Springs 168, 169 are connected at the front with the arms 166, 167, respectively, by rods 170, 171, and at the rear said springs are connected by rods 172, 173 with the upturned rear ends 174, 175 of the bars 129, 135, as shown in Figs. 5 and 8. The rods 172, 173 have screw-threaded connection with the springs in any suitable way so that by adjusting said rods the tension of said springs may be varied. It will be evident that by the construction described the weight of the operating parts of the harvester unit that are supported by the front end portions of the beams 143, 144, may be counterbalanced by said springs.

As best seen in Figs. 1 and 2, the rock shaft 160 at its inner end is provided with an arm 160ª that extends forwardly from the shaft in the same radial plane as the arms 158, 159 and projects laterally into substantially the longitudinally vertical plane of the pivots 137, 138, 142, the front end of the arm 160ª being pivotally connected with the upper end of a substantially vertically positioned link 160ᵇ which is pivotally connected at its lower end with a lug 52ª, secured to the stubbleward side of bar 52 of the longitudinally extending conveyor frame. By this construction, an operative connection is formed between the conveyor frame and the shaft 160, so that as the former is raised and lowered in the manner heretofore described, the shaft is rocked, and through the arms 158, 159 and the rods 152, 153, the beams 143, 144 and the harvester units supported thereby are correspondingly raised and lowered.

In this connection it should be explained that the pivots 147, 148 of the beams 143, 144 are in substantial alinement with the pivots 54 of the side bars 51, 52 of the conveyor supporting frame, so that as will more clearly appear later on the harvester frame that will presently be described will maintain its relation to the conveyor when the parts are adjusted vertically.

The operating parts of the harvester are mounted on a transverse frame which will be referred to as the harvester frame. This frame comprises front and rear transverse bars 176, 177, best shown in Figs. 2 and 8. Said bars are spaced apart slightly more than the width of the usual harvester apron, and are securely connected together at their outer ends in any suitable way, as by a longitudinal bar 178 shown in Fig. 5. Their inner ends are upturned as shown at 179 in Fig. 2, and 180 in Fig. 7, and are pivotally connected respectively by pivot bolts 181, 182 to brackets 183, 184 secured to and rising from the side and end bars 52, 53 of the conveyor frame. The pivot bolts 181, 182 extend fore and aft so that by this construction the outer end of the harvester frame may swing vertically with the harvester supporting frame, about said pivots, or, in other words, about a longitudinal axis. Although the pivots 181, 182 are below the horizontal plane of the pivots 137, 138, 142, the looseness provided in the connection of the beams 143, 144 with the harvester supporting frame, formed by the pivots 147, 148, permits vertical swinging movement of the outer end of the harvester frame along with the outer end of the harvester supporting frame as the latter rises and falls when traveling over uneven ground. The harvester frame is supported from the beams 143, 144 of the harvester supporting frame by longitudinally extending bars 185, 186 that extend under the frame bars 176, 177 and are secured thereto in any suitable way. The rear ends of the bars 185, 186 project back beyond the side bar 177 and overlap respectively the forward end portions of the beams 143, 144, as best shown in Figs. 5, 6 and 8, the rear ends of said bars being provided with stirrups 187, 188 that extend under the beams 143, 144 in the manner shown in Fig. 6. The stirrups 145, 146 carried by said beams in like manner extend under the bars 185, 186, respectively. Also, the bars 185, 186 extend between the standards 154, 155, and are mounted on the pivots 156 carried by said standards, all as shown in Fig. 6. It will be seen that by this construction we provide a hinge connection between the harvester frame and the beams 143, 144 of the harvester supporting frame, which permits folding of said parts with relation to each other about the pivots 156 as an axis when it is desired to transport the machine from place to place, but prevents the bars 185, 186 of the harvester frame from swinging downward beyond a position of alinement with the straight portions of the beams 143, 144 when the machine is at work in a field. The standards 154, 155 are secured to the side bar 177 of the harvester frame, preferably by rivets 189, as shown in Fig. 5, so that when the harvester frame is swung upward about the pivots 156 for transportation said standards swing with it, which, of course, necessitates at such time a slackening of the tension on the springs 168, 169 which can be accomplished by turning the screw-threaded rods 172, 173.

Mounted at the inner end portion of the harvester frame are two upwardly extending guide plates or shields 190 which are spaced apart a distance approximately equal to the width of the harvester apron, and extend a short distance over the side plate 87 of the conveyor housing, as best shown in Fig. 3, the front shield 190 being arranged to overlap the front plate 89 of said housing. Mounted between the guide plates 190 is a shaft 191 that carries a roller 192, a similar roller being provided at the outer or gainward end of the harvester frame. Running over these rollers is an apron 193 of the usual type, the upper flight of which is arranged to travel toward the conveyor frame, as indicated by the arrow in Fig. 3. As shown in said figure, the inner end of the apron is inclined upwardly from the main portion thereof, the shaft 191 being set somewhat higher than the plane of the main body of the apron, and to hold the apron down in such inclined position guides 195, 196 are provided, said guides being secured to the inner faces of the shields 190, as also shown in Fig. 3. Below the conveyor apron 193 is a bottom plate 197 which extends from end to end of the harvester frame, and is secured to the side bars 176, 177. The inner end of said bottom plate extends up in proximity to the upwardly extending portion of the apron, and terminates in a lip 198 that overlies the upper margin of the side plate 87 of the conveyor housing, as shown in the latter figure. By this construction a loose overlapping joint is provided between the harvester frame and the conveyor frame which prevents loss of grain between said two frames, but does not interfere with the upward swinging of the outer end of the harvester frame independently of the conveyor frame, or with vertical adjustment of said frames.

The apron 193 is driven through the shaft 191, which in turn is driven from the telescopic shaft member 125 by transmission devices that will now be described. The ends of the shaft 191 are projected through the shields 190, and its rear end carries a pinion 199, which, as shown in Fig. 7, is connected by a pinion 200 with a pinion 201 mounted on the side bar 177 of the harvester frame by means of a plate or bracket 202. Said bracket also supports a stud 203 on which the pinion 200 is mounted. The pinion 201 is keyed to a shaft 204, the rear end of which is connected to the universal connection 126 at the forward end of the telescopic shaft member 125. By this means rotation of the telescopic shaft rotates this train of pinions, and consequently rotates the shaft 191 and through it drives the harvester apron. It will be noted that this transmission mechanism is all mounted on the harvester frame and swings with it, and that the telescopic shaft comprising the members 124, 125 furnishes a flexible and longitudinally adjustable connection between the shaft 204 and the shaft 121 which is mounted on the main frame and is driven from the beater shaft 106, as previously described. Adjustment of the harvester frame, therefore, does not affect the driving connections.

The harvester frame is provided at its front margin with the usual finger bar 205 and sickle bar 206 arranged to be reciprocated longitudinally of the harvester frame to cut the grain. The sickle bar is reciprocated by means of a pitman 207, shown in Fig. 2, which is connected with the inner end of the sickle bar by a wrist pin 208, and is driven by a crank 209 carried at the forward end of the shaft 204 which extends across the harvester frame below the bottom plate 197, as shown in Fig. 3. The forward end of said shaft is provided with a cylindrical bearing 210 that is journaled in a bracket 211 carried by the harvester frame, as best shown in Fig. 2.

The harvester frame carries the usual reel 212 for presenting the standing grain to the cutting mechanism and delivering it to the apron 193, said reel being mounted on a shaft 213 that extends longitudinally of the harvester frame at a point over the finger bar 205, as best shown in Fig. 5. Said shaft at its outer end is mounted in a bearing block 214 carried by a supporting bar 215 that extends fore and aft, and is pivotally connected by a pivot 216 to the upper end of a standard 217 rising from the rear side bar 177 of the harvester frame. The forward end of the bar 215 is vertically adjustable and is supported by a forwardly and upwardly inclined brace 218 which at its lower end is connected by a pivot 219 to the lower end portion of the standard 217, the upper end portion of said brace being provided with a series of holes 220 adapted to register with holes 221 in the bar 215 so that said brace may be connected with said bar by a pin 222 passing through registering holes 220, 221. Obviously, by withdrawing the pin 222 the bar 215 may be raised or lowered to bring different holes 220, 221 into registration, thereby raising or lowering the front end of said bar and adjusting the vertical position of the outer end of shaft 213 and the reel carried by it. The outer end of the reel may be shifted fore and aft by moving the bearing block 214 along the supporting bar 215, suitable holes being provided in the bar for this purpose.

The reel shaft 213 is driven from the apron driving shaft 191, and, therefore, from the power plant on the main frame, by means of a worm wheel mounted on the inner end of the shaft 213 and enclosed in a housing 223, best shown in Fig. 2. Secured to and preferably integral with said housing is a housing 224 which contains a worm meshing with said worm wheel, and slidably mounted on a vertical shaft 225 which is connected by a universal coupling 226 to a shaft 227. The latter shaft is mounted in a bearing 228 carried by a bracket 229 secured to the harvester frame, as best shown in Fig. 2. At its lower end the shaft 227 carried a bevel gear 230 which meshes with a bevel gear 231 mounted on the forward end of the shaft 191. By this construction when the shaft 191 is rotated the shafts 227, 225 will be driven, which will drive the heel shaft 213 through the worm and worm wheel contained in the housings 224 and 223. The inner end of the reel shaft is supported by an inverted U-shaped rod or bracket 232, one of the ends of which is pivotally mounted in the bracket 211, its other end being pivotally mounted in a bracket 233 secured on the harvester frame, as shown in Fig. 2. The reel shaft 213 is adjustably secured to one of the arms of the bracket 232 by a clamp 234. By loosening the clamp 234 the inner end of the reel shaft may be adjusted vertically in the manner already described, and such adjustment is not interfered with by the driving connections since the driving worm may slide up and down longitudinally upon the shaft 225. The bracket 232 is preferably braced by an adjustable brace 235, the lower end of which is secured to the shield 190 while its upper end is adapted to be hooked through any one of a series of holes 236 in said bracket, which also provides means whereby the inner end of the reel may be adjusted fore and aft to correspond with the adjustment of its outer end, the universal coupling 226 providing for the necessary angulation between the reel drive shafts 225, 228. As shown in Figs. 1 and 2, forwardly projecting guides 237, 238 are provided at the inner and outer ends of the reel for guiding the grain to the finger bar. The inner guide 237 is best formed as a forward continuation of that end of the front guide plate 190 that lies adjacent to the reel. The outer guide 238 is in the form of a suitably shaped plate carried by a forwardly extending bar 239 secured to the lower end portion of one of the standards 217 by the pivot bolt 219, as shown in Fig. 5. A brace 240 connects the intermediate portion of the bar 239 with the upper portion of the standard 217 and holds the forward end of said bar in its proper relation to the harvester frame.

It is thought that it will be clear from the foregoing explanation that when the beater shaft 106 is driven the other operating parts of the thresher will be driven, and that power will be transmitted from said shaft to the operating parts of the harvesting mechanism;—that is to say, the apron, the sickle bar and the reel are all appropriately driven; also that the transmission mechanism for the harvester being mounted on the harvester frame and connected flexibly and adjustably with the power take-off elements on the main frame, the driving connections do not interfere with adjustment of the harvester frame.

When the machine is in use, or is being transported from place to place, the hinge connections between the thresher unit, comprising the main frame, and the harvester unit, comprising the harvester supporting frame and the harvester frame, permit the harvester supporting frame to adjust itself to inequalities in the ground, the outer portion of the harvester supporting frame riding on the ground wheel 134 while the harvester frame is supported by the harvester supporting frame through the connections including the arms 158, 159 and the springs 168, 169. The outer ends of the harvester supporting frame and of the harvester frame may swing vertically as necessary, owing to their pivotal connection with the main frame and the conveyor frame by the pivots 137, 138, 142, 181 and 182. If it be desired to adjust the harvester frame vertically, this may be done by vertically adjusting the conveyor frame by means of the hand wheel 72 and the adjusting connections including the rack bars 55, 56, which vertical movement of the conveyor frame acts through the link 52$^b$ to rock the shaft 160, and through its connection with the harvester unit simultaneously raise or lower it, the springs 168, 169 acting as a counterbalance to the weight of the harvester unit. Such adjustment, of course, raises or lowers the conveyor 49, but it also correspondingly raises or lowers the harvester frame and the parts carried by it, so that the delivery of grain from the apron 193 to the conveyor 49 is not affected. The flexible power transmission connections through which the operating parts of the harvesting mechanism are driven provide for the making of such adjustments without interfering with the operation of the parts.

For transportation purposes it is sometimes desirable to fold the harvester frame over upon the harvester supporting frame, and this may be accomplished by removing the bolts 181, 182 to disconnect the front and rear bars 176, 177 of the harvester frame from the conveyor frame. The springs 168, 169 are then slackened or disconnected, after which the harvester frame may be swung back over the harvester supporting frame, its longitudinal bars 185, 186 turning about the pivots 156, and the arms 158, 159 swinging downward to accommodate this folding movement. When thus folded the bars 185, 186 will occupy a position approximately at right angles with the forwardly extending portions of the beams 143, 144, and the folded unit will ride on the ground wheel 134. This folding of the parts of the harvester unit does not interfere with the capacity of the harvester supporting frame to adapt itself to inequalities in the ground, in view of the pivotal connection between said frame and the main frame. If the machine is to be transported along narrow roads or through gates where the width of the combined machine would prevent its passage, the harvester supporting frame may be disconnected from the main frame, and, with the harvester frame folded over upon it, be hitched on behind the main frame as a trailer, so that the entire machine will be no wider than the tread of the rear wheels 21, 22. When this is to be done a suitable dolly, or a two-wheeled truck, indicated by dotted lines at 241 in Fig. 5, may be run under the harvester supporting frame and connected therewith, as by braces 242, 243, or in any other suitable way, after which the harvester supporting frame may be hitched on behind the main frame and drawn in that way.

It is to be understood that the term "motor" as used in the specification and in the claims is employed in a generic sense to indicate any suitable power means, whether it be in the form of a prime mover, such as an internal combustion engine, or in the form of a power take off which is itself actuated from a more or less remote prime mover, as for example the power plant of a tractor. The claims are therefore to be construed accordingly.

What we claim as our invention and desire to secure by Letters Patent, is—

1. In a machine of the character described, the combination with a thresher unit comprising a wheeled main frame, threshing mechanism mounted thereon, a motor, and means for transmitting power from the motor to the threshing mechanism, of a harvester unit comprising a harvester supporting frame and a harvester frame pivotally connected together, and separately connected with the thresher unit at one side thereof to swing about a longitudinal axis, harvesting mechanism supported by the harvester frame including means for delivering grain to the thresher unit, and power transmitting connections for driving said harvesting mechanism from the thresher unit.

2. In a machine of the character described, the combination with a thresher unit comprising a wheeled main frame, threshing mechanism mounted thereon, a motor and power transmitting connections between said motor and said threshing mechanism, of a harvester unit comprising a harvester supporting frame and a harvester frame pivotally connected together, and separately connected with the thresher unit at one side thereof to swing about a longitudinal axis, harvesting mechanism including a traveling apron supported by the harvester frame and operating to deliver cut grain to the thresher unit, and power transmitting connections between said harvesting mechanism and the thresher unit.

3. In a machine of the character described, the combination with a thresher unit comprising a wheeled main frame, threshing mechanism mounted thereon, a motor, and power transmitting connections between said motor and said threshing mechanism, of a harvester unit comprising a harvester supporting frame and a harvester frame pivotally connected together, and separately detachably connected with the thresher unit at one side thereof to swing about a longitudinal axis, a ground wheel supporting the harvester supporting frame, harvesting mechanism supported by the harvester frame including a traveling apron arranged to deliver cut grain to the thresher unit, and power transmitting connections for driving said harvesting mechanism from the thresher unit.

4. In a machine of the character described, the combination with a thresher unit comprising a wheeled main frame, threshing mechanism mounted thereon, a motor, and power transmitting connections between said motor and said threshing mechanism, of a harvester unit comprising a harvester supporting frame connected with the thresher unit at one side thereof to swing about a longitudinal axis, a ground wheel supporting the latter frame, a harvester frame supported by the latter frame and connected therewith to swing about a transverse axis and also separately connected with the thresher unit to swing about a longitudinal axis, harvesting mechanism, including means for delivering grain to the thresher unit, mounted on said harvester frame, and power transmitting devices for driving the harvesting mechanism from the thresher unit.

5. In a machine of the character described, the combination with a thresher unit comprising a wheeled main frame, threshing mechanism mounted thereon, a motor, and power transmitting connections between said motor and said threshing mechanism, of a harvester unit comprising a harvester supporting frame detachably connected with the thresher unit to swing about a longitudinal axis, a ground wheel supporting the latter frame, a harvester frame supported by the latter frame and connected therewith to fold over thereupon, harvesting mechanism, including means for delivering grain to the thresher unit, carried by the harvester frame, and power transmitting devices for driving the harvesting mechanism from said thresher unit.

6. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame and a harvester frame, both of the latter frames being pivotally connected with the thresher unit to swing vertically about a longitudinal axis and being pivotally connected together to swing about a transverse axis, harvesting mechanism, including means for delivering grain to the thresher unit, carried by the harvester frame, and power transmitting devices for driving the harvesting mechanism from said thresher unit.

7. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame and a harvester frame, both of the latter frames being pivotally connected with the thresher unit to swing vertically about a longitudinal axis and being pivotally connected together to swing about a transverse axis, a ground wheel supporting the harvester supporting frame, means adjustably supporting the harvester frame from the harvester supporting frame, harvesting mechanism, including means for delivering grain to the thresher unit, carried by the harvester frame, and power transmitting devices for driving the harvesting mechanism from said thresher unit.

8. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the thresher unit to swing vertically about a longitudinal axis, a ground wheel supporting the latter frame, a harvester frame connected with the thresher unit to swing about a longitudinal axis and adjustably supported by the harvester supporting frame, harvesting mechanism, including means for delivering grain to the thresher unit, carried by the harvester frame, and power transmitting devices for driving said harvesting mechanism from said thresher unit.

9. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the thresher unit to swing about a longitudinal axis, a ground wheel supporting the latter frame, a harvester frame connected with the thresher unit to swing about a longitudinal axis and extending laterally from the main frame in front of and pivotally connected with said harvester supporting frame to swing over thereupon, means carried by the harvester supporting frame for supporting said harvester frame in operative position, harvesting mechanism, including means for delivering grain to the thresher unit, carried by the harvester frame, and power transmitting devices for driving said harvesting mechanism from said thresher unit.

10. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the main frame and extending laterally therefrom, a ground wheel supporting the harvester supporting frame, a harvester frame disposed in advance of the latter frame and connected therewith to swing over thereupon, harvesting mechanism, including means for delivering grain to the thresher unit, carried by the harvester frame, and power transmitting devices for driving said harvesting mechanism from said thresher unit.

11. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the main frame and extending laterally therefrom, a ground wheel supporting the harvester supporting frame, a harvester frame disposed in advance of the latter frame and connected therewith to swing over thereupon, said harvester frame being connected with the thresher unit to swing about a longitudinal axis, harvesting mechanism, including means for delivering grain to the thresher unit, carried by the harvester frame, and power transmitting devices for driving said harvesting mechanism from said thresher unit.

12. In a machine of the character described, the combination with a thresher unit comprising a wheeled main frame, threshing mechanism mounted thereon, a motor on the main frame, and power transmitting connections between said motor and said threshing mechanism, of a harvester supporting frame connected with the thresher unit and extending laterally therefrom, a ground wheel supporting the latter frame, forwardly projecting beams carried by the latter frame, a harvester frame supported by said beams in advance of the latter frame, means connected with the forward end portions of said beams for supporting the same, harvesting mechanism, including means for delivering grain to the thresher unit, carried by said harvester frame, and power transmitting devices for driving said harvesting mechanism from said thresher unit.

13. In a machine of the character described, the combination with a thresher unit comprising a wheeled main frame, threshing mechanism mounted thereon, a motor on the main frame, and power transmitting connections between said motor and said threshing mechanism, of a harvester supporting frame connected with the thresher unit and extending laterally therefrom, a ground wheel supporting the latter frame, forwardly projecting beams carried by the latter frame, means adjustably supporting the forward ends of said beams from the latter frame, a harvester frame supported by said beams in advance of the harvester supporting frame, harvesting mechanism, including means for delivering grain to the thresher unit, carried by said harvester frame, and power transmitting devices for driving said harvesting mechanism from said thresher unit.

14. In a machine of the character described, the combination with a thresher unit comprising a wheeled main frame, threshing mechanism mounted thereon, a motor on the main frame, and power transmitting connections between said motor and said threshing mechanism, of a harvester supporting frame connected with the thresher unit and extending laterally therefrom, a ground wheel supporting the latter frame, forwardly projecting beams carried by the latter frame, means adjustably supporting the forward ends of said beams from the latter frame, bars pivotally connected with and extending forward from said beams, a harvester frame carried by said bars, harvesting mechanism, including means for delivering grain to the thresher unit, carried by the harvester frame, and power transmitting devices for driving said harvesting mechanism from said thresher unit.

15. In a machine of the character described, the combination with a thresher unit comprising a wheeled main frame, threshing mechanism mounted thereon, a motor on the main frame, and power transmitting connections between said motor and said threshing mechanism, of a harvester supporting frame connected with the thresher unit and extending laterally therefrom, a ground wheel supporting the latter frame, forwardly projecting beams carried by the latter frame, means adjustably supporting the forward ends of said beams from the latter frame, bars overlapping the forward end portions of said beams and pivotally connected therewith to swing upward, means for preventing said bars from swinging downward beyond a position of alinement with the forward portions of said beams, a harvester frame carried by said bars, harvesting mechanism, including means for delivering grain to the thresher unit, carried by said harvester frame, and power transmitting devices for driving said harvesting mechanism from said thresher unit.

16. In a machine of the character described, the combination with a thresher unit comprising a wheeled main frame, threshing mechanism mounted thereon, a motor on the main frame, and power transmitting connections between said motor and said threshing mechanism, of a harvester supporting frame connected with the thresher unit and extending laterally therefrom, a ground wheel supporting the latter frame, forwardly projecting beams carried by the latter frame, means adjustably supporting the forward ends of said beams from the latter frame, bars overlapping the forward end portions of said beams and pivotally connected therewith to swing upward, stirrups carried by said beams and bars respectively and operating to prevent said bars from moving downward beyond a position of substantial alinement with the forward portions of said beams, a harvester frame carried by said bars, harvesting mechanism, including means for delivering grain to the thresher unit, carried by said harvester frame, and power transmitting devices for driving said harvesting mechanism from said thresher unit.

17. In a machine of the character described, the combination with a thresher unit comprising a wheeled main frame, threshing mechanism mounted thereon, a motor on the main frame, and power transmitting connections between said motor and said threshing mechanism, of a harvester supporting frame connected with the thresher unit and projecting laterally therefrom, a ground wheel supporting the latter frame, a harvester frame disposed in advance of the latter frame and pivotally connected therewith to swing upward out of operative position, a spring mounted on the harvester supporting frame and tending normally to hold the harvester frame in its operative position, harvesting mechanism, including means for delivering grain to the thresher unit, carried by the harvester frame, and power transmitting devices for driving said harvesting mechanism from said thresher unit.

18. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the thresher unit and extending laterally therefrom, a ground wheel supporting the latter frame, vertically swinging beams connected with the latter frame and extending forward therefrom, a harvester frame disposed in front of the latter frame and supported by the forward portions of said beams, vertically swinging arms connected with the harvester supporting frame and with the forward portions of said beams, spring means connected with said arms and with the latter frame for counterbalancing the weight supported by the forward ends of said beams, harvesting mechanism, including means for delivering grain to the thresher unit, carried by the harvester frame, and power transmitting devices for driving the harvesting mechanism from the thresher unit.

19. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the thresher unit and extending laterally therefrom, a ground wheel supporting the latter frame, vertically swinging beams connected with the latter frame and extending forward therefrom, a rock shaft mounted on the harvester supporting frame, forwardly extending arms carried by said rock shaft, connections between said arms and the forward end portions of said beams, counterbalancing springs connected with the harvester supporting frame and with said rock shaft, means for adjusting said rock shaft, a harvester frame supported by said beams, harvesting mechanism, including means for delivering grain to the thresher unit, carried by said harvester frame, and power transmitting devices for driving said harvesting mechanism from the thresher unit.

20. In a machine of the character described, the combination with a thresher unit comprising a wheeled main frame, threshing mechanism mounted thereon, a motor on the main frame, and power transmitting connections between said motor and said threshing mechanism, of a harvester unit comprising a harvester supporting frame connected with the thresher unit and extending laterally therefrom, a ground wheel supporting the latter frame, vertically swinging beams connected with the latter frame and extending forward therefrom, a rock shaft mounted on the harvester supporting frame, forwardly extending arms carried by said rock shaft, connections between said arms and the forward end portions of said beams, counterbalancing springs connected with the harvester supporting frame and with said rock shaft, means for adjusting said rock shaft, forwardly extending bars pivotally connected with the forward end portions of said beams and normally in substantial alinement therewith, said bars being adapted to swing upward into angular relation to said beams, a harvester frame carried by said bars, harvesting mechanism, including means for delivering grain to the thresher unit, carried by said harvester frame, and power transmitting devices for driving said harvesting mechanism from the thresher unit.

21. In a machine of the character described, the combination with a thresher unit comprising a wheeled main frame, a conveyor frame connected therewith to swing vertically, a conveyor carried by the latter frame, means operable to vertically adjust said conveyor frame, threshing mechanism mounted on the main frame, a motor on the main frame, and power transmitting connections between said motor, the conveyor and the threshing mechanism, of a harvester unit comprising a harvester supporting frame connected with the thresher unit to swing vertically about a longitudinal axis, a ground wheel supporting the latter frame, supporting means connected with the harvester supporting frame to swing vertically about a transverse axis, a harvester frame carried by said means in advance of the harvester supporting frame, an adjusting member mounted on the latter frame and operable to adjust the harvester frame vertically, means connecting the conveyor frame with said adjusting member for actuating the latter by vertical adjustment of the conveyor frame, harvesting mechanism, including means for delivering grain to the thresher unit, carried by said harvester frame, and power transmitting devices for driving said harvesting mechanism from the thresher unit.

22. In a machine of the character described, the combination with a thresher unit comprising a wheeled main frame, a conveyor frame connected therewith to swing vertically, a conveyor carried by the latter frame, means operable to vertically adjust said conveyor frame, threshing mechanism carried by the main frame, a motor on the main frame, and means for driving said threshing mechanism and the conveyor from said motor, of a harvester unit connected with the thresher unit at one side thereof to swing vertically about a longitudinal axis and comprising harvesting mechanism operable to deliver grain to said conveyor, and power transmitting devices for driving said harvesting mechanism from the thresher unit.

23. In a machine of the character described, the combination with a thresher unit comprising a wheeled main frame, a conveyor frame connected therewith to swing vertically, a conveyor carried by the latter frame, means operable to vertically adjust said conveyor frame, threshing mechanism carried by the main frame, a motor on the main frame, and means for driving said threshing mechanism and the conveyor from said motor, of a harvester unit connected with the thresher unit at one side thereof to swing vertically about a longitudinal axis and comprising a harvester frame pivotally connected with said conveyor frame to swing vertically about a longitudinal axis, harvesting mechanism carried by the harvester frame, including means for delivering grain to said conveyor, and means for driving said harvesting mechanism from the thresher unit.

24. In a machine of the character described, the combination with a thresher unit comprising a wheeled main frame, a conveyor frame connected therewith to swing vertically, a conveyor carried by the latter frame, means operable to vertically adjust said conveyor frame, threshing mechanism carried by the main frame, a motor on the main frame, and means for driving said threshing mechanism and the conveyor from said motor, of a harvester unit comprising a harvester supporting frame connected with the thresher unit at one side thereof to swing about a longitudinal axis, a ground wheel supporting the latter frame, a harvester frame supported by the latter frame and pivotally connected with said conveyor frame to swing about a longitudinal axis, harvesting mechanism carried by the harvester frame, including means for delivering grain to said conveyor, and power transmitting devices for driving said harvesting mechanism from the thresher unit.

25. In a machine of the character described, the combination with a thresher unit comprising a wheeled main frame, a conveyor frame connected therewith to swing vertically, a conveyor carried by the latter frame, means operable to vertically adjust said conveyor frame, threshing mechanism carried by the main frame, a motor on the main frame, and means for driving said threshing mechanism and the conveyor from said motor, of a harvester unit comprising a harvester supporting frame connected with the thresher unit at one side thereof to swing about a longitudinal axis, a ground wheel supporting the latter frame, a harvester frame disposed in advance of the latter frame and pivotally connected with the conveyor frame to swing about a longitudinal axis, means pivotally connected with the harvester supporting frame to swing vertically and supporting the harvester frame from the harvester supporting frame, harvesting mechanism carried by the harvester frame, including means for delivering grain to said conveyor, and power transmitting devices for driving said harvesting mechanism from the thresher unit.

26. A thresher unit comprising a wheeled main frame, a conveyor frame pivotally connected at the rear thereof with the main frame to swing vertically, means mounted on the main frame and connected with the forward portion of the conveyor frame for swinging the same vertically, a conveyor mounted on the conveyor frame, a motor on the main frame, threshing mechanism carried by the main frame, and means for driving said threshing mechanism and said conveyor from said motor, in combination with a harvester frame pivotally connected with the forward portion of said conveyor frame to swing about a longitudinal axis, harvesting mechanism carried by said harvesting frame, including means for delivering grain to said conveyor, and power transmitting devices for driving said harvesting mechanism from the thresher unit.

27. A thresher unit comprising a wheeled main frame, a conveyor frame pivotally connected at the rear thereof with the main frame to swing vertically, means mounted on the main frame and connected with the forward portion of the conveyor frame for swinging the same vertically, a conveyor mounted on the conveyor frame, a motor on the main frame, threshing mechanism carried by the main frame, a transverse shaft mounted on the main frame, means for driving said shaft from said motor, power transmitting devices for driving the threshing mechanism from said shaft, and means for driving the conveyor from said shaft, in combination with a harvester frame pivotally connected with the forward portion of said conveyor frame to swing about a longitudinal axis, harvesting mechanism carried by said harvester frame, including means for delivering grain to said conveyor, and power transmitting devices for driving said harvesting mechanism from the thresher unit.

28. In a machine of the character described, the combination with a thresher unit comprising a wheeled main frame, a conveyor frame pivotally connected at the rear thereof with the main frame to swing vertically, means mounted on the main frame and connected with the forward portion of the conveyor frame for swinging the same vertically, a conveyor mounted on the conveyor frame, a motor on the main frame, threshing mechanism carried by the main frame, and means for driving said threshing mechanism and said conveyor from said motor, of a harvester unit comprising a harvester supporting frame pivotally connected with the thresher unit at one side thereof to swing about a longitudinal axis, a ground wheel supporting the latter frame, forwardly extending beams pivotally connected at the rear with the latter frame to swing vertically, the pivots of said beams being substantially alined with the rear pivots of said conveyor frame, a harvester frame supported by the forward portions of said beams and pivotally connected therewith to swing vertically out of operative position, said harvester frame being pivotally connected with the forward portion of said conveyor frame to swing about a longitudinal axis, harvesting mechanism carried by said harvester frame, including means for delivering grain to said conveyor, and power transmitting devices for driving said harvesting mechanism from the thresher unit.

29. In a machine of the character described, the combination with a thresher unit comprising a wheeled main frame, a conveyor frame pivotally connected at the rear thereof with the main frame to swing vertically, means mounted on the main frame and connected with the forward portion of the conveyor frame for swinging the same vertically, a conveyor mounted on the conveyor frame, a motor on the main frame, threshing mechanism carried by the main frame, a transverse shaft mounted on the main frame, means for driving said shaft from said motor, power transmitting devices for driving the threshing mechanism from said shaft, and means for driving the conveyor from said shaft, of a harvester unit comprising a harvester supporting frame pivotally connected with the thresher unit at one side thereof to swing about a longitudinal axis, a ground wheel supporting the latter frame, forwardly extending beams pivotally connected at the rear with the latter frame to swing vertically, the pivots of said beams being substantially alined with the rear pivots of said conveyor frame, a harvester frame supported by the forward portions of said beams and pivotally connected therewith to swing vertically out of operative position, said harvester frame being pivotally connected with the forward portion of said conveyor frame to swing about a longitudinal axis, harvesting mechanism carried by said harvester frame, including means for delivering grain to said conveyor, rocking means supported by the harvester supporting frame and operatively connected with the conveyor frame and said beams to swing the latter vertically in unison with vertical movement of the conveyor frame, and power transmitting devices for driving said harvesting mechanism from said shaft.

30. In a machine of the character described, the combination with a thresher unit comprising a wheeled main frame, threshing mechanism mounted on said frame, a conveyor operable to deliver grain to the threshing mechanism, a motor on the main frame, and means for driving the threshing mechanism and the conveyor from said motor, of a harvester unit detachably connected with the thresher unit at one side thereof and comprising a harvester supporting frame and a ground wheel therefor, a harvester frame adapted to fold over upon the harvester supporting frame, harvesting mechanism carried by the harvester frame and including means for delivering grain to said conveyor, and disconnectible power transmitting devices for driving said harvesting mechanism from the thresher unit, whereby the harvester unit when disconnected from the thresher unit and folded may be drawn as a trailer by the thresher unit.

31. A combination harvester thresher frame construction comprising a wheel supported thresher frame, a grain conveyor frame pivotally supported on said thresher frame to swing about a transverse axis, a harvester frame pivotally connected to said conveyor frame to swing about a longitudinal axis, a harvester supporting frame pivotally connected to said thresher frame to swing about a longitudinal axis, said harvester frame being pivotally supported on said harvester supporting frame to swing about a transverse axis substantially in line with the axis of the pivotal connection between the conveyor frame and the thresher frame.

32. A combination harvester thresher frame construction comprising a wheel supported thresher frame, a grain conveyor frame pivotally mounted at one end on said thresher frame, means mounted on said thresher frame and cooperating with means on said conveyor frame for raising and lowering the opposite end of said conveyor frame relative to said thresher frame, a harvester frame pivotally connected to said conveyor frame to swing about a longitudinal axis, a harvester supporting frame pivotally connected to said thresher frame to swing about a longitudinal axis, said harvester frame being pivotally supported on said harvester supporting frame to swing about a transverse axis substantially in line with the axis of the pivotal connection between the conveyor frame and the thresher frame.

33. A combination harvester thresher frame construction comprising a wheel supported thresher frame, a grain conveyor frame pivotally supported on said thresher frame to swing about a transverse axis, a harvester supporting frame connected with said thresher frame to swing vertically about a longitudinal axis, forwardly projecting beams carried by the harvester supporting frame, means adjustably supporting the forward ends of said beams from the latter frame, and a harvester frame supported by said beams in advance of the harvester supporting frame, said harvester frame being also connected with said grain conveyor frame to swing vertically about a longitudinal axis.

34. A combination harvester thresher frame construction comprising a wheel supported thresher frame, a grain conveyor frame pivotally supported on said thresher frame to swing vertically about a transverse axis, a harvester supporting frame connected with the thresher frame to swing vertically about a longitudinal axis, forwardly projecting beams carried by the harvester supporting frame, means adjustably supporting the forward ends of said beams from the latter frame, bars pivotally connected with and extending forward from said beams, and a harvester frame carried by said bars, said harvester frame being pivotally connected with said grain conveyor frame to swing vertically about a longitudinal axis.

35. A combination harvester thresher frame construction comprising a wheel supported thresher frame, a grain conveyor frame pivotally supported on said thresher frame to swing vertically about a transverse axis, a harvester supporting frame pivotally connected with said thresher frame to swing vertically about a longitudinal axis, a harvester frame pivotally connected with said grain conveyor frame to swing vertically about a longitudinal axis, said harvester frame being pivotally supported on said harvester supporting frame to swing about a transverse axis, a rock shaft mounted on said harvester supporting frame, and means connecting said rock shaft with said grain conveyor frame and with said harvester frame whereby said harvester frame is moved vertically by vertical movement of said grain conveyor frame.

36. A combination harvester thresher frame construction comprising a wheel supported thresher frame, a grain conveyor frame pivotally supported on said thresher frame to swing vertically about a transverse axis, a harvester supporting frame pivotally connected with said thresher frame to swing vertically about a longitudinal axis, a harvester frame pivotally connected with said grain conveyor frame to swing vertically about a longitudinal axis, pivot connections between said harvester frame and said harvester supporting frame permitting vertical movement of said harvester frame relative to said harvester supporting frame, and means operatively connected with said grain conveyor frame for moving said pivot connections vertically upon vertical movement of said grain conveyor frame.

37. In a machine of the character described, the frame construction comprising a wheel supported main frame, a harvester supporting frame and a harvester frame pivotally connected together and separately connected with the main frame at one side thereof to swing about a longitudinal axis.

38. In a machine of the character described, the frame construction comprising a wheel supported main frame, a harvester supporting frame and a harvester frame separately pivotally connected with the main frame to swing vertically about a longitudinal axis and being pivotally connected together to swing about a transverse axis, and means adjustably supporting the harvester frame from the harvester supporting frame.

39. In a machine of the character described, the frame construction comprising a wheel supported main frame, a harvester supporting frame connected with the main frame to swing about a longitudinal axis, a harvester frame connected with said main frame to swing about a longitudinal axis, and extending laterally from the main frame in front of and pivotally connected with said harvester supporting frame to swing over thereupon, and means carried by the harvester supporting frame for supporting said harvester frame in operative position.

40. In a machine of the character described, the frame construction comprising a wheel supported main frame, a harvester supporting frame connected with the main frame at one side thereof to swing about a longitudinal axis, forwardly projecting beams carried by the latter frame, a harvester frame pivotally supported by said beams in advance of the harvester supporting frame, and means mounted on the harvester supporting frame and connected with the forward end portions of said beams for supporting the same.

LOUIS A. PARADISE.
EDWIN FREDERICK HUDDLE.